United States Patent
Cooks et al.

(10) Patent No.: US 10,727,041 B2
(45) Date of Patent: Jul. 28, 2020

(54) SYSTEMS AND METHODS FOR SEPARATING IONS AT ABOUT OR ABOVE ATMOSPHERIC PRESSURE

(71) Applicant: Purdue Research Foundation, West Lafayette, IN (US)

(72) Inventors: Robert Graham Cooks, West Lafayette, IN (US); Dalton Snyder, West Lafayette, IN (US); Amar S. Basu, West Lafayette, IN (US); Wen-Ping Peng, Hualien (TW)

(73) Assignee: Purdue Research Foundation, West Lafayette, IN (US)

( * ) Notice: Subject to any disclaimer, the term of this patent is extended or adjusted under 35 U.S.C. 154(b) by 3 days.

(21) Appl. No.: 16/072,084

(22) PCT Filed: Jan. 27, 2017

(86) PCT No.: PCT/US2017/015236
§ 371 (c)(1),
(2) Date: Jul. 23, 2018

(87) PCT Pub. No.: WO2017/132444
PCT Pub. Date: Aug. 3, 2017

(65) Prior Publication Data
US 2019/0027356 A1   Jan. 24, 2019

Related U.S. Application Data

(60) Provisional application No. 62/288,082, filed on Jan. 28, 2016.

(51) Int. Cl.
*H01J 49/00* (2006.01)
*H01J 49/42* (2006.01)
(Continued)

(52) U.S. Cl.
CPC .......... *H01J 49/4225* (2013.01); *G01N 27/62* (2013.01); *G01N 27/622* (2013.01);
(Continued)

(58) Field of Classification Search
CPC ......... G01N 23/2252; G01N 2223/401; G01N 2223/321; G01N 2223/079;
(Continued)

(56) References Cited

U.S. PATENT DOCUMENTS 6,177,668 B1   1/2001   Hager
6,838,666 B2   1/2005   Ouyang et al.
(Continued)

FOREIGN PATENT DOCUMENTS

WO   2009/023361 A2   2/2009
WO   2009/102766 A1   8/2009
(Continued)

OTHER PUBLICATIONS

Ouyang, 2004, Rectilinear ion trap: concepts, calculations, and analytical perforomace of a new mass analyers, Analytical Chemistry, 76:4595-4605.
(Continued)

*Primary Examiner* — Michael Maskell
(74) *Attorney, Agent, or Firm* — Brown Rudnick LLP; Adam M. Schoen

(57) ABSTRACT

The invention generally relates to systems and methods for separating ions at about or above atmospheric pressure. In certain embodiments, the invention provides systems that include an ionization source that generates ions and an ion trap. The ion trap is maintained at about or above atmospheric pressure and includes a plurality of electrodes and at least one inlet configured to receive a gas flow and at least one outlet. The system is configured such that a combination of a gas flow and one or more electric fields produced by the
(Continued)

electrodes separates the ions based on mass-to-charge ratio and sends the separated ions through the at least one outlet of the ion trap.

12 Claims, 9 Drawing Sheets

(51) Int. Cl.
G01N 27/62 (2006.01)
H01J 49/16 (2006.01)
(52) U.S. Cl.
CPC ........ *H01J 49/0013* (2013.01); *H01J 49/165* (2013.01); *H01J 49/4205* (2013.01); *H01J 49/429* (2013.01); *H01J 49/4295* (2013.01)
(58) Field of Classification Search
CPC ... G01N 2223/6462; G01N 2223/6116; G01N 2223/076; G06K 9/00127; H01J 2237/2806; H01J 2237/24585; H01J 2237/221; H01J 2237/2807
USPC .......................... 250/281, 282, 290, 292, 293
See application file for complete search history.

(56) References Cited

U.S. PATENT DOCUMENTS

| | | | | |
|---|---|---|---|---|
| 6,972,407 | B2* | 12/2005 | Miller | G01N 27/624 250/282 |
| 7,335,897 | B2 | 2/2008 | Takats et al. | |
| 7,361,311 | B2 | 4/2008 | Cooks et al. | |
| 8,304,718 | B2 | 11/2012 | Ouyang et al. | |
| 8,410,431 | B2* | 4/2013 | Ouyang | H01J 9/0027 250/288 |
| 8,637,817 | B1* | 1/2014 | Krutchinsky | H01J 9/02 250/293 |
| 8,859,956 | B2 | 10/2014 | Ouyang et al. | |
| 2003/0157269 | A1 | 8/2003 | Ratner et al. | |
| 2009/0294655 | A1* | 12/2009 | Ding | H01J 9/004 250/283 |
| 2011/0042560 | A1 | 2/2011 | Ouyang et al. | |
| 2012/0119079 | A1 | 5/2012 | Ouyang et al. | |
| 2013/0280819 | A1* | 10/2013 | Cooks | H01J 9/0445 436/173 |
| 2014/0224981 | A1 | 8/2014 | Owen et al. | |
| 2014/0264004 | A1 | 9/2014 | Cooks | |
| 2015/0136964 | A1* | 5/2015 | Cooks | H01J 9/067 250/281 |

FOREIGN PATENT DOCUMENTS

| | | | | |
|---|---|---|---|---|
| WO | 2010/045049 | A1 | 4/2010 | |
| WO | 2010/126797 | A1 | 11/2010 | |
| WO | 2010/127059 | A1 | 11/2010 | |
| WO | WO-2013184320 | A1 * | 12/2013 | ............... H01J 49/26 |
| WO | WO-2015195599 | A3 * | 9/2016 | ............ H01J 49/061 |

OTHER PUBLICATIONS

Ouyang, 2009, Handheld Miniature Ion Trap Mass Spectrometers, Anal. Chem., 81(7):2421-2425.
Ouyang, 2009, Miniature Mass Spectrometers, Ann. Rev. Anal. Chem., 2:187-214.
Pan, 2004, Nanoelectrospray Ionization of Protein Mixtures: Solution pH and Protein pI, Anal. Chem.. 76:1165-1174.
Prentice, 2011, DC Potentials Applied to an End-cap Electrode of a 3-D Ion Trap for Enhanced MS Functionality, Int J Mass Spectrom, 306:114-122.
Prentice, 2012, Dipolar DC collisional activation in a "stretched" 3-D ion trap: the effect of higher order fields on rf-heating, J Am Soc Mass Spectrom, 23:736-744.

Qin, 1996, Matrix-Assisted Laser Desorption Ion Trap Mass Spectrometry: Efficient Isolation and Effective Fragmentation of Peptide Ions. Anal Chem, 68:2108-2112.
Rice, 1927, Theories of Unimolecular Gas Reactions at Low Pressures, J. Am. Chem. Soc., 49:1617-1629.
Sanders, 2010, Hand-held mass spectrometer for environmentally relevant analytes using a variety of sampling and ionization methods, Euro. J. Mass Spectrom, 16:11-20.
Shiea, 2005, Electrospray-assisted laser desorption/ionization mass spectrometry for direct ambient analysis of solids, J. Rapid Comm in Mass Spectrometry, 19:3701-3704.
Snyder, 2016, Experimental characterization of secular frequency scanning in ion trap mass spectrometers, J. Am. Soc. Mass Spectrom., 27:1243-1255.
Snyder, 2016, Single analyzer precursor scans using an ion trap, Rapid Commun. Mass Spectrom., 30:800-804.
Sokol, 2011, Miniature mass spectrometer equipped with electrospray and desorption electrospray inonization for direct analysis of organics from solids and solutions, Int. J. Mass Spectrom., 306:187-195.
Splendore, 1996, A simulation study of ion kinetic energies during resonant excitation in a stretched ion trap, International Journal of Mass Spectrometry and Ion Processes, 156:11-29.
Takats, 2004, Mass spectrometry sampling under ambient conditions with desorption electrospray ionization, Science, 306:471-473.
Tanaka, 1988, Protein and Polymer Analyses up to m/z 1000000 by Laser Ionization Time-of-flight Mass Spectrometry, Rapid Commun. Mass Spectrom., 2:151-153.
Wang, 1993, The non-linear resonance ion trap. Part 2. A general theoretical analysis, Int. J. Mass Spectrom. Ion. Processes, 124:125-144
Wang, 2013, The coupling effects of hexapole and octopole fields in quadrupole ion traps: a theoretical study, J. Mass Spectrom, 48:937-944
Welling, 1998, Ion/molecule reactions, mass spectrometry and optical spectroscopy in a linear ion trap, Int. J. Mass Spectrom. Ion Proc., 172:95-114.
Wells, 2000. Control of chemical mass shifts in the quadrupole ion trap through selection of resonance ejection working point and rf scan direction, Anal. Chem, 72:2677-2683
Williams, 1994, Resonance Ejection Ion-Trap Mass-Spectrometry and Nonlinear Field Contributions—The Effect of Scan Direction on Mass Resolution, Analytical Chemistry, 66:725-729.
Xiong, 2013, Ambient Aerodynamic Desorption/Ionization Method for Microparticle Mass Measurement, Analytical Chemistry, 85:4370-4375
Xu, 2010, Miniaturization of Mass Spectrometry Analysis Systems, JALA, 15:433-439.
Yamishita, 1984, Electrospray Ion Source. Another Variation on the Free-Jet Theme, J. Phys. Chem., 88:4451-4459.
Yost, 1979, Triple quadrupole mass spectrometry for direct mixture analysis and structure elucidation, Anal Chem, 51:1251.
Ambient Ionization Mass Spectrometry, Marek Domin & Robert Cody (Eds) Royal Society of Chemistry, Cambridge, UK, 2015.
Badman, 2000, Miniature Mass Analzers, J. Mass Spectrom., 35:659-671.
Badu-Tawiah, 2011, Ambient ion soft landing., Anal. Chem., vol. 83:2648-2654.
Baird, 2015, Ambient ion mobility, Ph.D. Thesis, Purdue University.
Baird, 2015, Ion Creation, Ion Focusing, Ion/Molecule Reactions, Ion Separation, and Ion Detection in the Open Air in a Small Plastic Device, Analyst, 140:696-700.
Blain, 2004, Towards the Hand-Held Mass Spectrometer: Design Considerations, Simulation and Fabrication of Micrometer-scaled Cylindrical Ion Traps, Int. J. Mass Spectrom., 236:91-104.
Busch, 2011, Detecting Ions in Mass Spectrometers with the Faraday Cup, Spectroscopy, 26(11): 12-18.
Carroll, 1975, Atmospheric Pressure Ionization Mass Spectrometry: Corona Discharge Ion Source for Use in Liquid Chromatograph-Mass Spectrometer-Computer Analytical System, Anal. Chem., 47:2369-2373.
Cody, 2005, Versatile New Ion Source for the Analysis of Materials in Open Air under Ambient Condition, Anal. Chem., 77:2297-2302.

(56) References Cited

OTHER PUBLICATIONS

Collin, 2007, Dynamic collision-induced dissociation of peptides in a quadrupole ion trap mass spectrometer, Anal Chem, 79:5468.
Cooks, 2006, Ambient Mass Spectrometry, Science 311:1566-1570.
Cooks, 2011, New ionization methods and miniature mass spectrometers for biomedicine: DESI imaging for cancer diagnostics and paper spray ionization for therapeutic drug monitoring, Faraday Discussions, 149(1):247-267.
Cunningham, 2006, High amplitude short time excitation: a method to form and detect low mass product ions in a quadrupole ion trap mass spectrometer, J Am Soc Mass Spectrom, 17:81-84.
Dawson, 1976, Quadrupole Mass Spectrometery and its Applications, Elsevier, Amsterdam.
de Hoffman, 1996, Tandem Mass Spectrometry A Primer. J. Mass Spectrom., 31:129-137.
Douglas, 2005, Linear ion traps in mass spectrometry, Mass Spectrom. Rev, 24:1-29.
Fenn, 1989, Electrospray Ionization for Mass Spectrometry of Large Biomolecules, Science, 246:64-71.
Fico, 2007, Miniaturization and Geometry Optimization of a Polymer-Based Rectilinear Ion Trap, Anal. Chem, 79:8076-8082.
Franzen, 1994, The non-linear ion trap. Part 5. Nature of non-linear resonances and resonant ion ejection. Int. J. Mass Spectrom. Ion Processes, 130:15.
Gao, 2006, Handheld Rectilinear Ion Trap Mass Spectrometer, Anal. Chem., 78:5994-6002.
Gao, 2008, Breaking the pumping speed barrier in mass spectrometry: discontinuous atmospheric pressure interface, Anal. Chem, 80:4026-4032.
Gao, 2008, Design and Characterization of a Multisource hand-Held Tandem Mass Spectrometer, Anal. Chem., 80:7198-7205.
Goeringer, 1996, Kinetics of collision-induced dissociation in the Paul trap: A first-order model, Rapid Communications in Mass Spectrometry, 10:328-334.
Goth, 2017, Ion mobility—mass spectrometry as a tool to investigate protein-ligand interactions, Anal. Bioanal. Chem., 409:4305-4310.
Guan, 1989, General phase modulation method for stored waveform inverse Fourier transform excitation for Fourier transform ion cyclotron resonance mass spectrometry, J. Chem. Phys., 91:775-777.
Guan, 1993, Stored waveform inverse Fourier transform axial excitation/ejection for quadrupole ion trap mass spectrometry, Anal. Chem., 65:1288-1294.
Guan, 1996, Stored waveform inverse Fourier transform (SWIFT) ion excitation in trapped-ion mass spectometry—theory and applications, Int. J. Mass Spectrom. Ion Processes, 157/158, 5-37.
Hadjar, 2011, IonCCD™ for direct position-sensitive charged-particle detection: from electrons and keV ions to hyperthermal biomolecular ions, J. Am. Soc. Mass Spectrom., 22:612-623.
Hager, 2009, Off-resonance excitation in a linear ion trap, J Am Soc Mass Spectrom, 20:443-450.
Harris, 2011, Ambient Sampling/Ionization Mass Spectrometry: Applications and Current Trends, Anal. Chem., 83:4508-4538.
Hendricks, 2014, Autonomous in-situ analysis and real-time chemical detection using a backpack miniature mass spectrometer: concept, instrumentation development and performance, Anal. chem., 86:2900-2908.
Hou, 2011, Sampling Wand for an Ion Trap Mass Spectrometer, Anal. Chem., 83:1857-1861.
International Preliminary Report on Patentability, dated Oct. 9, 2018, PCT/US2017/026269, 8 pages.
International Search Report, dated Jan. 30, 2018, PCT/US2017/026269, 12 pages.
Johnson, 1991, Ms-Ms Parent Scans on a Quadrupole Ion Trap Mass-Spectrometer by Simultaneous Resonant Excitation of Multiple Ions, Int. J. Mass Spectrom. Ion Proc., 106:197-212.
Julian, 1993, Broad-Band Excitation in the Quadrupole Ion-Trap Mass-Spectrometer Using Shaped Pulses Created with the Inverse Fourier-Transform, Anal. Chem, 65:1827-1833.
Karas, 2000, Nano-electrospray ionization mass spectrometry: addressing analytical problems beyond routine, Journal of Analytical Chemistry, 366(6-7):669-676.
Kelly, 2010, The Ion Funnel: Theory, Implementations, and Applciations, Mass Spectrometry Reviews, 29:294-312.
Kogelschatz, 2003, Dielectric-barrier Discharges: Their History, Discharge Physics, and Industrial Applications, Plasma Chemistry and Plasma Processing, 23:1-46.
Kondrat, 1978 Multiple Reaction Monitoring in Mass Spectrometry Mass Spectrometry for Direct Analysis of Complex-Mixtures. Analytical Chemistry, 50(14):2017-2021.
Laiko, 2000, Atmospheric Pressure Matrix-Assisted Laser Desorption/Ionization Mass Spectrometry, Anal. Chem, 72:652-657.
Laskay, 2007, Dynamic collision-induced dissociation (DCID) in a quadrupole ion trap using a two-frequency excitation waveform: II. Effects of frequency spacing and scan rate, J Am Soc Mass Spectrom, 18:2017-2025.
Laskay, 2008, Resonance excitation and dynamic collision-induced dissociation in quadrupole ion traps using higher-order excitation frequencies, Rapid Commun Mass Spectrom, 22:2342-2348.
Li, 2014, Miniature Ambient Mass Analysis System, Anal. Chem., 86:2909-2916.
Makarov, 1996, Resonance Ejection from the Paul Trap: A Theoretical Treatment Incorporating a Weak Octapole Field, Anal Chem, 68:4257-4263.
Mar. 1989, Resonance excitation of ions stored in a quadrupole ion trap. Part 1. A simulation study, Int. J. Mass Spectrom. Ion Processes, 95:119-156.
Mar., 1997, An Introduction to Quadrupole Ion Trap Mass Spectrometry, J. Mass Spectrom, 32:351-369.
Marcus, 1952, Unimolecular Dissociations and Free Radical Recombination Reactions, The Journal of Chemical Physics, 20:359-364.
Mulligan, 2006, Desorption electrospray ionization with a portable mass spectrometer: in situ analysis of ambient surfaces, Chem. Com., 709-1711.
Murrell, 2003, "Fast Excitation" CID in a Quadrupole Ion Trap Mass Spectrometer, J. Am. Soc. Mass Spectrom., 14:785-789.

\* cited by examiner

SYSTEMS AND METHODS FOR SEPARATING IONS AT ABOUT OR ABOVE ATMOSPHERIC PRESSURE

RELATED APPLICATION

The present application is a 35 U.S.C. § 371 national phase application of PCT/US17/15236, filed Jan. 27, 2017, which claims the benefit of and priority to U.S. provisional patent application Ser. No. 62/288,082, filed Jan. 28, 2016, the content of which is incorporated by reference herein in its entirety.

FIELD OF THE INVENTION

The invention generally relates to systems and methods for separating ions at about or above atmospheric pressure.

BACKGROUND

Mass spectrometry (MS) has become an important method in analytical chemistry due to its high molecular specificity in combination with very wide applicability, speed, sensitivity and quantitative capability. The development of electrospray ionization has meant that virtually any type of molecule can be ionized and analyzed by MS. However, there are limitations to mass spectrometry. For example, mass spectrometers have typically been large bench-top instruments, found only in laboratories, incapable of use for point-of-care needs. That limitation has led to the development of much smaller (miniature) mass spectrometers that can be operated outside the laboratory (Badman et al., J. Mass Spectrom., 35 (2000) 659-671).

Another limitation of mass spectrometry is that the sampling and ionization sequence most used in MS experiments is too slow. To address that limitation, MS analysis without any sample preparation was developed (ambient MS or more often ambient ionization) (Cooks et al., Science, 311 (2006) 1566-1570). Ambient ionization has proven durable with many variations being introduced and some being commercialized over the past decade (Harris et al., Analytical Chemistry, 83, 4508-4538 (2011); and Ambient Ionization Mass Spectrometry, Marek Domin & Robert Cody (Eds.) Royal Society of Chemistry, Cambridge, UK, 2015). The two concepts of miniature mass spectrometers and ambient ionization are closely linked in that in situ (on site, point-of-care) mass spectrometry requires both a small instrument and a simplified sampling/ionization routine (Cooks et al., Faraday Disc., 2011, 149 (1), 247-267).

Even with the advent of miniature mass spectrometers and ambient ionization techniques, there are still limitations to mass spectrometry that need to be addressed. Mainly, the most important step in mass spectrometry, mass analysis, cannot be performed at atmospheric pressure. All previous approaches to mass-to-charge (m/z) measurements on ionized atoms, molecules or molecular clusters have been based on operations in vacuum. A general solution to the problem of molecular ion ambient mass analysis is lacking.

SUMMARY

The invention provides systems and methods that are capable of separating and analyzing ions at about or above atmospheric pressure. Aspects of the invention are based on trapping of ions, mass-to-charge (m/z) specific excitation, and the use of pneumatic forces to make permanent the temporary separations produced by excitation. In that manner, the invention utilizes a gas flow in combination of with fields (e.g., AC and RF fields) to produce mass-to-charge (m/z) based separations.

Certain aspects of the invention provide systems for separating ions. The systems include an ionization source that generates ions and an ion trap. The ion trap is maintained at about or above atmospheric pressure and includes a plurality of electrodes and at least one inlet configured to receive a gas flow and at least one outlet. The system is configured such that a combination of a gas flow and one or more electric fields produced by the electrodes separates the ions based on mass-to-charge ratio and sends the separated ions through the at least one outlet of the ion trap. The system may additionally include a gas source operably coupled to the at least one inlet. The system may further include an ion detector configured to receive the separated ions (e.g., a mass spectrometer or miniature mass spectrometer) or an ion collector configured to receive the separated ions. The system may further include an ion focusing element positioned between the ion trap and the ion detector.

In certain embodiments, the ion detector does not include a vacuum system or the vacuum system of the ion detector is not operated during ion analysis. For example, the ion detector may be a miniature mass spectrometer that does not include a vacuum system.

Numerous different ion trap configurations are known in the art and are suitable to be used with systems of the invention. An exemplary ion trap is a quadrupole ion trap, such as a rectilinear ion trap.

Other aspects of the invention provide methods for separating ions at about or above atmospheric pressure. The methods involve trapping ions within an ion trap at about or above atmospheric pressure, and applying an electric field and a gas flow to the ions within the ion trap at about or above atmospheric pressure to separate the ions by mass-to-charge ratio. In certain embodiments, prior to the trapping step, the method includes ionizing a sample to generate the ions. Methods of the invention may additionally include analyzing the ions separated by mass-to-charge ratio or collecting the ions separated by mass-to-charge ratio. Numerous ion analysis techniques exist. In an exemplary embodiment, analyzing includes directing the ions into a mass spectrometer (e.g., miniature mass spectrometer), optionally operated at atmospheric pressure such that mass analysis occurs at atmospheric pressure. Mass analysis may also be performed above atmospheric pressure or below atmospheric pressure (e.g. in a vacuum).

Numerous different electric fields and gas flows can be applied to the ion trap, examples of which are described below. In certain embodiments, the electric field includes frequency components that correspond to characteristic frequencies of motion of at least some of the trapped ions. The gas flow can be uniform or have a specific profile.

Another aspect of the invention provides systems for separating ions that include an ionization source that generates ions. The system also includes an ion trap that includes a hollow member having a plurality of electrodes along a plurality of inner walls of the hollow member. The hollow member also includes at least one inlet configured to receive a gas flow and at least one outlet. The system is configured such that a combination of a gas flow and one or more frequency components of the electric field produced by the electrodes separates the ions based on mass-to-charge ratio and sends the separated ions through the at least one outlet of the ion trap. The ion trap may be maintained at a pressure below atmospheric pressure, at atmospheric pressure, or above atmospheric pressure.

Numerous configurations are possible for the hollow member, such as a tube or a square. Numerous different techniques can be used to apply the plurality of electrodes to the plurality of inner walls of the hollow member. In certain embodiments, the plurality of electrodes are printed onto the plurality of inner walls of the hollow member. In certain embodiments, the plurality of electrodes are along the plurality of inner walls of the hollow member in a quadrupole arrangement. In other embodiments, the plurality of electrodes are along the plurality of inner walls of the hollow member in a triple quadrupole arrangement.

The system may additionally include a gas source operably coupled to the at least one inlet. The system may further include an ion detector configured to receive the separated ions (e.g., a mass spectrometer or miniature mass spectrometer) or an ion collector configured to receive the separated ions. The system may further include an ion focusing element positioned between the ion trap and the ion detector.

In certain embodiments, the ion detector does not include a vacuum system or the vacuum system of the ion detector is not operated during ion analysis. For example, the ion detector may be a miniature mass spectrometer that does not include a vacuum system.

DETAILED DESCRIPTION

Figure 1:
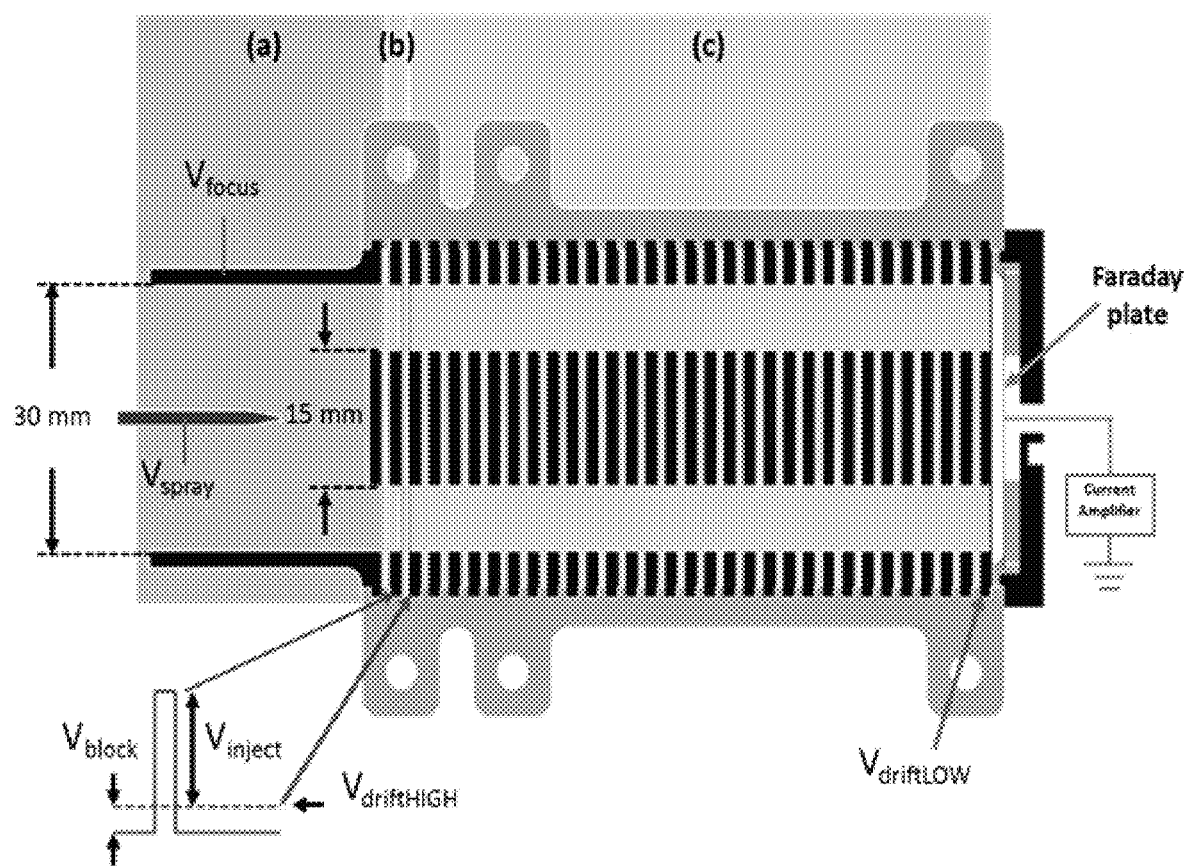
FIG. 1 is an illustration showing an ambient ion mobility spectrometer to which is fitted the RIT electrode structure of FIG. 2, and which is modified by using a limited number of electrodes and bringing the ions to a focus before they enter a miniature mass spectrometer.

The invention generally relates to systems and methods for separating ions at about or above atmospheric pressure. In systems and methods of the invention, an ion population, trapped in either two or three dimensions by an appropriate electric or electromagnetic field, is subjected (i) to excitation by a dipolar or other signal with frequency components which correspond to characteristic frequencies of motion of some of the trapped ions and (ii) simultaneously or subsequently to a pneumatic forces (which are optionally not uniform in the radial direction). This combination of forces then leads to separation of ions of given m/z values for subsequent detection, collection or other uses.

In the systems and methods of the invention, a quadrupole ion trap/mass filter is used to trap ions in a more or less tight cloud in the center/along central axis of an rf electric field. The half-width of distribution of the ions in the cloud will depend on field strength, ion density and pressure in device. Pure quadrupole fields will give smaller relative distributions. An orthogonal fluid flow (e.g. pneumatic flow) is used to shear off ions from the outer periphery of the ion cloud and carry them through a one-way ion gate for subsequent analysis and utilization. An AC excitation may be used to direct ions from the center of the ion cloud to a surface of the cloud so that ions of particular secular frequency (and hence m/z value) are placed selectively in positions where pneumatic transport to the analysis/utilization region can occur.

Atmospheric pressure refers to the pressure exerted by the weight of air in the atmosphere of Earth. The standard atmosphere is a unit of pressure defined as 101325 Pa (1.01325 bar), equivalent to 760 mmHg (torr), 29.92 in Hg and 14.696 psi. Systems and methods of the invention perform ion separation and ion analysis at about or above atmospheric pressure. This is in contrast to prior art mass analyzers that require high levels of vacuum for ion separation and ion analysis. Typically, a mass spectrometer is operated with a vacuum pressure of about $10^{-3}$ torr to $10^{-8}$ torr for ion separation and ion analysis.

Without being limited to any particular theory or mechanism of action, it is believed that ions flowing under the influence of pneumatic forces in an atmospheric pressure gas are focused (e.g. using DC fields) so that they are spatially confined (e.g. to an annulus or to a central axis, etc.). The ions then move through an electric field which may maintain their confinement or confine them further using DC and RF fields (e.g. as in an RF-only quadrupole or multipole) but the main purpose of which is to impose on the ions a set of frequencies of motion which are dependent on the mass/charge ratios of the ions and the properties of the electric field including the amplitude and frequency of the applied RF and the field type and its magnitude.

In simple cases, the field would be radially symmetrical, but cases in which there is x,y asymmetry are interesting as they provide additional possibilities for ion manipulation in the x,y-plane. Also in simple cases, the field would have no z-component but the presence of a z-component would also enrich the set of control elements. The set of imposed frequencies includes a fundamental frequency ('secular frequency') and many other frequencies resulting from harmonics and interactions between the secular and applied RF frequencies. As the ions move through the field they will also be subjected to a dipolar frequency which if in resonance with the ion's secular frequency (for example) will cause them to pick up energy in a resonant fashion and undergo excursions towards the electrodes in the x or y direction (depending on the direction of the field). This process is analogous to that used in resonance excitation in quadrupole ion traps except that the atmospheric pressure will limit the extent to which the ions can be excited. It is expected that the x (or y) dimension of ions in resonance with the AC field will increase relative to that of ions which are not in resonance. Imposition of sets of different frequency AC signals (e.g. chosen using a SWIFT waveform and randomly selected so that a substantial fraction of the frequency space is used) will allow the Hadamard multiplex advantage to be enjoyed. The ion beam cross section can be further manipulated (e.g. by imposing a 180° out of phase signal to the z-electrodes to accentuate the extension in the x direction or by adjusting main RF amplitude or frequency in certain ways).

Now, given the pneumatic flow of the ions in the z-direction, it becomes possible to intercept displaced ions (even if the displacement is radially symmetrical or if it involves x-expansion or y-expansion) and to measure these ions using an ion detector (such as one that operates at atmospheric pressure). By using multiple sets of AC frequencies the ion intensities can be transformed back into the resonant (secular) frequency scale and hence to ion mass/charge ratios, viz. a mass spectrum.

An MS/MS experiment could be performed by exciting the ions sufficiently strongly to cause collision induced dissociation as well as an increase in cross section. The collected displaced ions could then be mass analyzed by repeating the first experiment again at atmospheric pressure. Alternatively, vacuum based methods such as TOF could be used and would be highly efficient.

In an embodiment that uses a central beam and a confining RF field that is linear (quadrupolar), the effects of resonance energy absorption and thermal motion balance better than in a higher order fields where the smaller thermal effects can lead to large excursions. In a preferred embodiment, a sub-linear field is used in order to minimize thermal effects on ion position while allowing resonance absorption to give spatially recognizable effects. As excited ions are thermalized, they will tend to move to the center of the trap, so a balance of the period of activation and the amplitude of the applied signals is helpful for assessing behavior. The flow profile of the air might also be used to enhance the separation of ions which have and have not been resonantly excited.

In this manner, the entire mass spectrometry experiment is possible in air (i.e., ambient ionization, ambient focusing, ambient detection, and ambient separating can all be achieved in air at or above atmospheric pressure). The separated ions can be recorded in the form of a mass spectrum by 'scanning' in a systematic fashion the parameters that lead to separation or the intensity (ion flux or similar quantity) of ions of a particular m/z value (or set of values) can be measured. The separated ions can also be subjected to forces that cause dissociation (e.g. collision-induced dissociation) and if a second stage of mass analysis is made available, tandem MS (MS/MS) data can be recorded. The separated ions can also be collected on a suitable surface ('soft landing') or reacted with a suitable reagent (ion/molecule reaction) or be examined spectroscopically or by other physiochemical means. Various methods of multiplexed measurement, including Hadamard and other transform methods, are also possible.

An important feature of the invention is the simplification of the mass spectrometer which result from ambient m/z analysis. The often large, heavy, power-consuming vacuum system is dispensed with. In addition, the electronics needed to operate the mass-selection device consist of function generators which must output particular frequencies at relatively low amplitudes in a range (kHz) that is readily accessible. The combination of simplified electronics and absence of a vacuum system should greatly simplify all mass spectrometers, but this effect will be particularly important in handheld portable instruments where weight and power and electronic complexity are key considerations.

Another important differentiating aspect of the invention is the utilization of gas flow in combination with electric fields to produce m/z based separations. In one implementation of the invention, a population of ions will be carried in a gas flow in a trapping electric field (e.g. 2D quadrupole field). Under an appropriate laminar gas flow regime (selected by the Reynolds number), streamlines will run parallel to one another. The streamlines may have different velocity, such as the parabolic flow profile common in circular channels, or they could be uniform flow. A single ion would, on average, remain in its streamline, although diffusion would cause temporary, random walk excursions from the streamline, thus widening its average trajectory. In the case of a distribution of ions (i.e. an ion cloud), diffusion would disperse the cloud over time, as determined by the gas diffusion coefficient of each ion. An ion could cross from one streamline to another if acted on by an external force, such as an orthogonal electrical field. It could also do so through inertia, for example, a sharp turn in a channel could cause a particle to travel toward the outer streamline.

In one embodiment of the present invention, orthogonal electric fields are used to direct ions to separate streamlines in a mass-selective fashion. In a linear quadrupole ion trap, a 2D quadrupole field can be set up by applying a radiofrequency (RF) waveform between the sets of parallel rods in the quadrupole. Assuming the amplitude and frequency of the waveform are chosen appropriately, as described by Mathieu parameters a and q, the fields will focus ions above the imposed lower mass cutoff (LMCO) towards the center streamlines within the ion trap. The ions can then be mass selectively excited to higher amplitudes in the trap and thus to outer streamlines, by applying a small amplitude, lower frequency supplementary AC waveform to the trap electrodes in a monopolar, dipolar, or quadrupolar fashion. If the frequency of this waveform matches the secular frequency (or other characteristic frequency) of ions of a particular m/z, those ions will gain kinetic energy from the AC and RF fields and increase their amplitude in the trap, assuming the time of application and amplitude of the waveform are both appropriate. This will therefore results in the selected ion subset occupying outer streamlines, whereas the rest of the ion population remains focused to the inner streamlines.

The frequency of the supplementary signal can be used to manipulate many subsets of ions of chosen m/z values either sequentially or simultaneously. For example, the frequency of the supplementary AC can be scanned through a chosen frequency regime, exciting, in sequence, ions whose secular frequencies match the frequency of the applied AC. Massto-charge can be correlated with the frequency of excitation (through the Mathieu parameters) which can be correlated with time, giving a mass spectrum. Exciting multiple ion populations simultaneously can be accomplished with an AC waveform with many frequency components, as in a SWIFT (Stored Waveform Inverse Fourier Transform) waveform. All ions whose oscillatory frequencies correspond to at least one of the frequency components in the SWIFT waveform will be excited to outer streamlines simultaneously. One can further manipulate the SWIFT (or related) waveform so that different frequency components have different amplitudes. In this way, one can excite different ion populations simultaneously to different outer streamlines. It is possible in principle to use a Hadamard transform to deconvolute the various frequency components and hence to obtain the mass spectrum at enhanced signal/time because of the multiplexed nature of this measurement.

Once ions have been separated, the streamlines can be split by a junction of appropriate geometry. In the case of a purely quadrupolar trap operating under symmetric fields, the cross section of the ion cloud will be circular, and the outer annulus of the cloud will be occupied primarily by the ions directed away from the center, as mentioned above. In this case, an annular flow splitter, such as two coaxial tubes, could be used to direct the outer and inner ions to separate outlets. If the RF or AC fields are asymmetric, the ion cloud could be stretched into an ellipse in the x or y direction. In this case, more conventional flow splitters (such as tees) could be used to effect m/z separation. Splitting streamlines will not capture all of the outer ions, only some fraction determined by separation parameters (ion m/z, collisional cross section, pressure, applied fields, temperature, etc.). Optimizing this fraction will improve mass resolution as well as detection limits.

The separated ion clouds flow to separate outlets with separate detectors, or the streamlines can lead to separate pixels of a single imaging detector. The detector could be an ion CCD, faraday plate, multichannel plate, or other modality adapted for ambient operation.

In another implementation of the invention, a population of ions will be held in a fixed position by a trapping electric field (e.g. a 3D ion trap) and a gas flow will be used to interrogate and carry away ions residing (even temporarily) near the periphery of the trapped ion cloud. In this exemplary embodiment, ionization is by nanoESI with gentle pneumatic transport (using $N_2$) of the charged microdroplets through a transport tube the length of which is set so that ions are deposited in the trap with little forward momentum. The ion trap is a modified 3D rectilinear ion trap (RIT) 4 mm×5 mm×43 mm (half lengths, viz. $x_o$, $y_o$ and $z_o$) and is modified to have hollow walls in the 5 mm half-length long slit bearing y electrodes. The size of the slit is modified to achieve the desired pneumatic interaction of the flowing gas with the periphery of the ion cloud. The trap is operated in the RF-only ion trapping mode with application of AC signals with frequencies in resonance with the secular frequencies of ions of interest. Mass-selective excitation increases excursions in the x-direction (assuming y-applied signals) and results in ions being captured in the stream of the gas flowing through the hollow walls of the y-electrodes. The slipstream effect is created by apertures in the hollow walls (FIG. 1).

Figure 2:
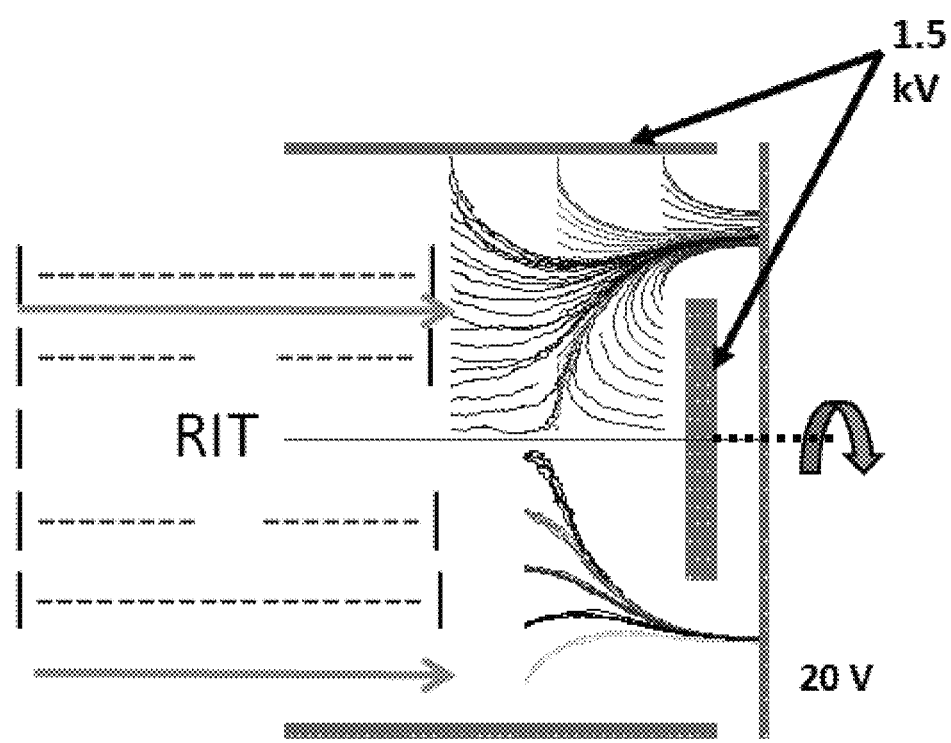
FIG. 2 is an illustration showing an electrode structure within which the RIT (dashed lines) is placed, showing pneumatic force transporting some ions into the region where focus is achieved (trajectories calculated by SIMION). Apertures in front plate (20 v) not shown.
Figure 3:
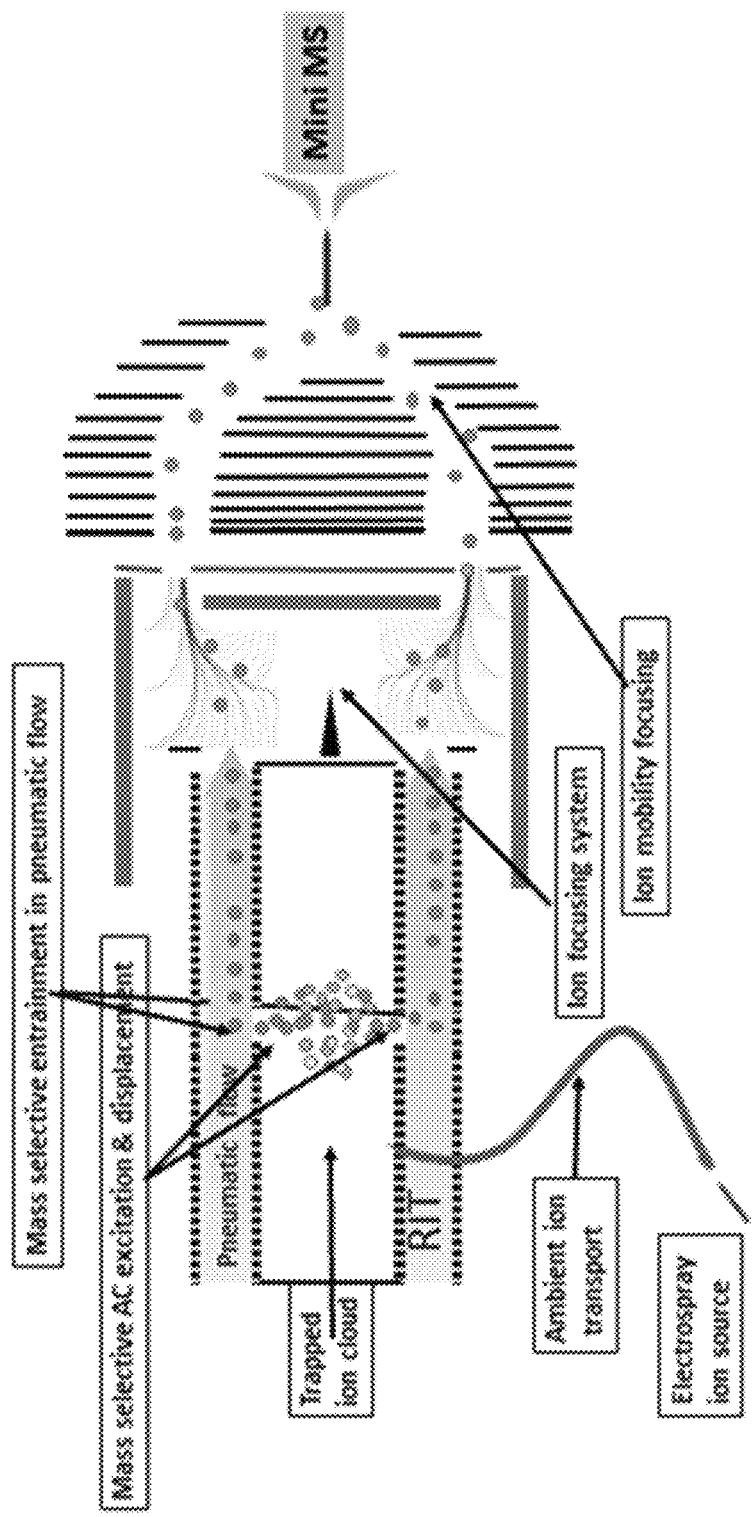
FIG. 3 is an illustration showing an overall view of an ambient mass spectrometer.
Figure 4:
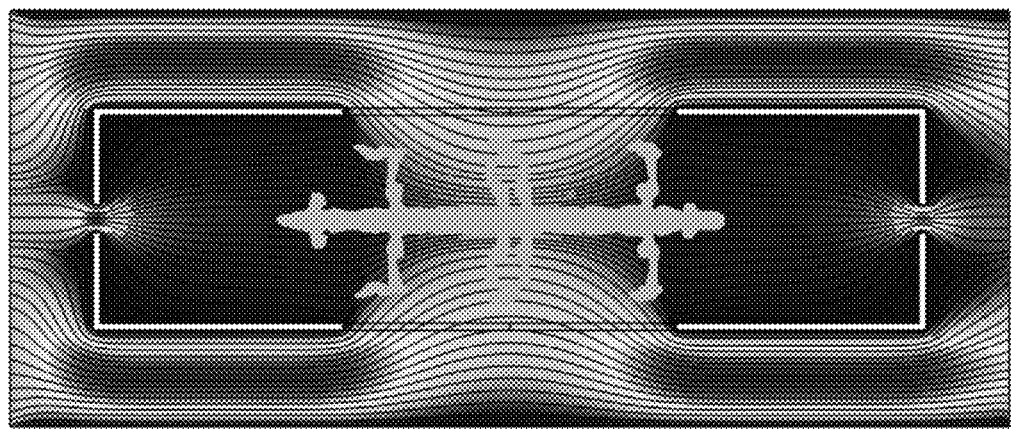
FIG. 4 is an illustration showing superimposed simulations of pneumatic gas flow and ion motion associated with a rectilinear ion trap. An applied gas flow (directed from left to right) is present along a confined region outside the trap, and some flow may also enter through the aperture in the endcap. As shown by the streamlines, the flow is largely confined to the outer region but dips into the trap along the center slit. Colors show the magnitude of gas velocity which is comparatively small along the central axis of the trap. Trapped ions (tan) are mass selectively excited at their secular frequencies, and these excited mass selected ions on the periphery of the ion cloud are carried away by the gas flow. Flow simulations were for a 3 mm endcap dimension, 400 um aperture, and applied flow of 1 mm/s; however, the same flow structures will also be found in traps of other size and/or geometry, so long as it is operating in an appropriate low Reynolds number regime. Simulations of ion motion used SIMION 8, ac scan over 10 ms ejecting m/z 195 from a 5 mm RIT at 1 Torr (rf amplitude of 500 Vpp and ac amplitude 100 Vpp). We assume higher voltages will give similar effects at atmospheric pressure. Similar effects are seen with multiple slit versions of the ion trap structure.
Figure 5A:
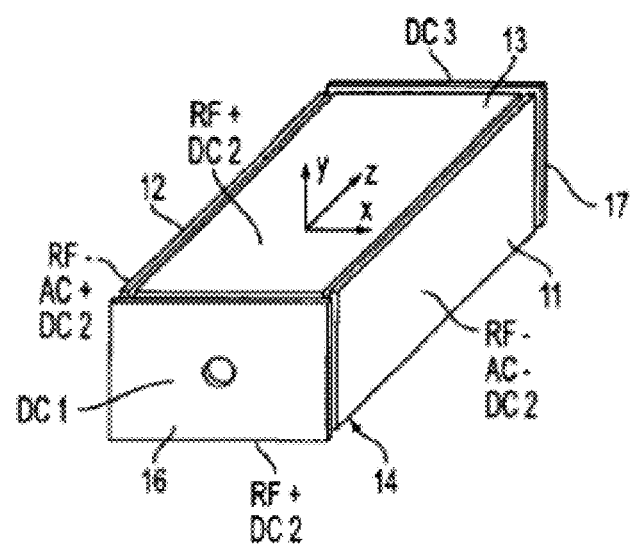
FIGS. 5A-B show a rectilinear ion trap which allows injection/ejection of ions along the z axis and DC trapping voltages.
Figure 5B:
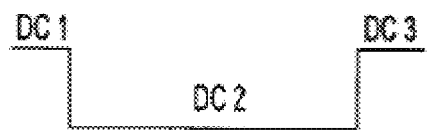
Figure 6A:
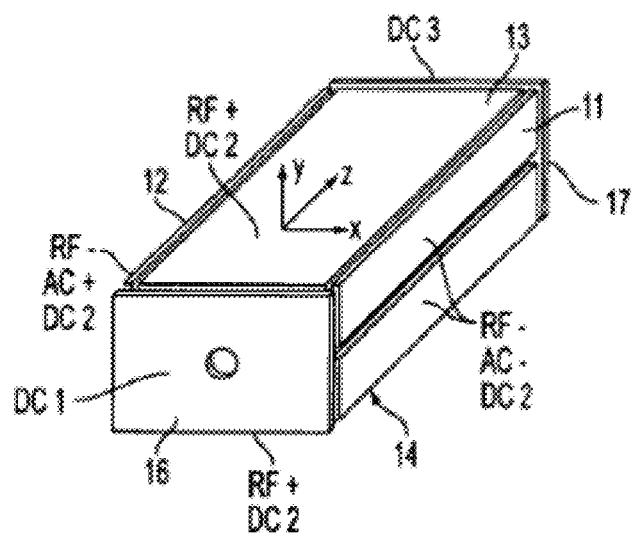
FIGS. 6A-B show a rectilinear ion trap with slits for ion injection/ejection along the x axis and DC trapping voltages.
Figure 6B:
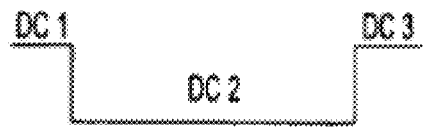

The RIT trap is placed within a three electrode structure modeled on that used to create a 'source' region for the atmospheric pressure ion mobility spectrometer (FIG. 2), as also described in Baird (Ambient ion mobility, Ph. D. Thesis, Purdue University, 2015), the content of which is incorporated by reference herein in its entirety. With this arrangement, any excited ions that have been moved away from the ion cloud by the gas will be appropriately placed to be focused into an annulus and transferred through the grid of the 'IMS source' and into the IMS analyzer region (FIG. 1). Transport of the annularly focused ion cloud through the IMS has been shown in Baird (Ambient ion mobility, Ph. D. Thesis, Purdue University, 2015). In these experiments the full IMS system can be truncated to just six ring electrodes of uniform size followed by a set of four electrodes of decreasing size which will be used to bring the annular beam to a point of focus. The entrance to a miniature mass spectrometer can be located at this focal point so that mass analysis can be performed on the arriving ion population. The pneumatics and ion optics of this arrangement are illustrated in FIG. 3. A simulation that shows the combined pneumatic and ion optical effects is shown in FIG. 4.

Using systems of the invention, methods of mass selective ion separation and analysis based upon the application of pneumatic forces on a population of electromagnetically or electrostatically trapped ions in conjunction with mass-selective modulation of ion excursions within the trapped ion body is achieved. The ion cloud is typically confined in 2D or 3D by an electric or magnetic field. The ion cloud may be in motion but confined in 2D by an electric or magnetic field. Shaping of the ion cloud may be performed mass-selectively by resonance excitation of particular ions using oscillating electric fields with frequencies matching the frequencies of motion of particular ions. It is believed that the mass-selective shaping causes ions to preferentially occupy selected sub-volumes within the ion cloud. The system usually operates at about atmospheric pressure up to about 10 atmospheres although higher pressures may be used. In preferred embodiments, the entire system is operated at ambient pressure or above.

There are numerous approaches for shaping the ion cloud. For example, shaping of the ion cloud may be achieved by polar, dipolar, quadrupolar, or multipolar oscillating electric fields. The ion cloud could have many different shapes. Exemplary shapes for the ion cloud are circular, elliptical, or rectangular cross sections. Numerous different electric fields may be applied to the ion cloud. In certain embodiments, the electric field includes a high frequency (RF) component supplemented with a single AC waveform whose frequency is selected to excite a subset of ions. In other embodiments, the electric field includes a high frequency (RF) component supplemented with one or more orthogonal AC waveforms whose frequencies are selected to excite a subset of ions in orthogonal dimensions. In certain embodiments, higher order electric fields are deliberately introduced in order to improve performance in trapping and manipulation of the trapped ion population.

Typically, the ion cloud is carried through a channel in a specific direction via pneumatic flow. The flow may be split into one or more channels, diverting specified regions of the ion cloud to different channels. Usually, the pneumatic flow is composed of a nonreactive gas. In certain embodiments, the pneumatic flow has a Reynolds number less than 20. There are numerous different profiles that can be used for the pneumatic flow. Exemplary profiles include a uniform, linear, parabolic, or polynomial flow profile. In certain embodiments, the pneumatic flow has a non-uniform flow profile, causing different regions of the ion cloud to travel at different speeds. In certain embodiments, the pneumatic flow is oriented away from the primary channel and towards an outlet channel. In certain embodiments, one or more of the outlet channels provides a counter-flow in a direction opposite the primary channel.

Any type of ion directing apparatus can be used to assist in diverting sub-volumes of the ion cloud to separate outlet channels. For example, a skimmer assists in diverting sub-volumes of the ion cloud to separate outlet channels. Ions exit the channel at different times depending on their position within the ion cloud. A selected ion's retention time measured by a downstream detector is related to its mass.

The outlets may have one or more detection elements. The frequencies and/or amplitudes of the applied fields are changed over time, and the response of the detector element is interpreted as a mass spectrum. The signals from one or more detection elements is mathematically processed. For example, one may take a ratio of two detector signals, or the fourier transform/inverse FFT of the detector signal. In certain embodiments, the detector is an ion CCD. In other embodiments, the detector is a faraday cup In certain embodiments, the pneumatic flow is composed of a gas that reacts with the trapped ions. The separated ions may be utilized downstream in chemical reactions. In other embodiments, the separated ions are collected on a surface or in a fluid for off-line analysis. In another embodiment, ions may be moved pneumatically in a tube (at or above atmospheric pressure) with a miniature quadrupole mass filter fitted into the tube (or an octopole or hexapole for better efficiency). In this embodiment, there is a very small tube, operated at atmospheric pressure, with pneumatic force moving ions at velocities that correspond to appropriate KE's for vacuum quadrupole mass filters and with electrodes printed on an inside of the tube. This should allow atmospheric pressure mass manipulation of ions. In an exemplary set-up, the quadrupoles can be arranged in three sections, such as in a triple quadrupole (QqQ). Therefore, product ion scans, precursor ion scans, neutral loss scans, and selected reaction monitoring scans can be executed for MS/MS mass analysis at operating pressure. The quadrupole can be constructed by optical fibers, e.g., fibers coated with gold to form electrodes.

In such an embodiment, the system can be operated in a usual mass selective stability mode (but other modes including ion trap operation, mass selective instability, etc. are not precluded). In such an embodiment, the system can have relatively long 'rods' and hence high resolution (if physical dimensional tolerance appropriate). Printing can be accomplished by covering an inside of a tube uniformly with a substrate (gold film, organic, etc.). The outside of the tube is then masked and the tube is irradiate (e.g., by laser light) to remove the inner coating at selected places. The z-position should be controlled to produce the structure.

The precision forming of the electrodes within the tube is important. One approach to obtain precision placement of electrodes within the tube involves dividing electrodes into multiple (radial) sections of different lengths, thus avoiding electrode crossing. Another approach to avoiding electrode crossing would be to use square walled tube. Mass selective ejection can be used to address any precision issues. Also one can use laminar flow of ions to minimize dispersion due to collisions or one could also add focusing radially.

An advantage of this embodiment is that is allows for use annular focusing at atmospheric pressure prior to ions entering into the quadrupole. This would place ions nears walls where pneumatics could allow laminar flow and only small forces would be required to mass-selectively eject ions This embodiment can include multiple variations, such as a triple quadrupole, allowing for ion dissociation within the device, e.g., collisional or photo-dissociation through walls. This embodiment can be interfaced easily with a liquid chromatography system followed by atmospheric pressure ionization.

The device combines mass analysis with ion transport, which is ideal for non-proximate ion transfer mass analysis. Such embodiments could be very useful in environmental, fuel, explosives and other monitoring techniques.

Ion Generation

Any approach for generating ions known in the art may be employed. Exemplary mass spectrometry techniques that utilize ionization sources at atmospheric pressure for mass spectrometry include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references in incorporated by reference herein its entirety.

Exemplary mass spectrometry techniques that utilize direct ambient ionization/sampling methods including desorption electrospray ionization (DESI; Takats et al., Science, 306:471-473, 2004 and U.S. Pat. No. 7,335,897); direct analysis in real time (DART; Cody et al., Anal. Chem., 77:2297-2302, 2005); Atmospheric Pressure Dielectric Barrier Discharge Ionization (DBDI; Kogelschatz, Plasma Chemistry and Plasma Processing, 23:1-46, 2003, and PCT international publication number WO 2009/102766), ion generation using a wetted porous material (Paper Spray, U.S. Pat. No. 8,859,956), and electrospray-assisted laser desorption/ionization (ELDI; Shiea et al., J. Rapid Communications in Mass Spectrometry, 19:3701-3704, 2005). The content of each of these references in incorporated by reference herein its entirety.

Ion generation can be accomplished by placing the sample on a porous material and generating ions of the sample from the porous material or other type of surface, such as shown in Ouyang et al., U.S. Pat. No. 8,859,956, the content of which is incorporated by reference herein in its entirety. Alternatively, the assay can be conducted and ions generated from a non-porous material, see for example, Cooks et al., U.S. patent application Ser. No. 14/209,304, the content of which is incorporated by reference herein in its entirety). In certain embodiments, a solid needle probe or surface to which a high voltage may be applied is used for generating ions of the sample (see for example, Cooks et al., U.S. patent application publication number 20140264004, the content of which is incorporated by reference herein in its entirety).

In certain embodiments, ions of a sample are generated using nanospray ESI. Exemplary nano spray tips and methods of preparing such tips are described for example in Wilm et al. (Anal. Chem. 2004, 76, 1165-1174), the content of which is incorporated by reference herein in its entirety. NanoESI is described for example in Karas et al. (Fresenius J Anal Chem. 2000 March-April; 366(6-7):669-76), the content of which is incorporated by reference herein in its entirety.

Rectilinear Ion Trap

Rectilinear ion traps are described for example in Ouyang et al. (U.S. Pat. No. 6,838,666), the content of which is incorporated by reference herein in its entirety. FIGS. 5A-B, 6A-B, 7A-B and 8A-B illustrate four rectilinear ion trap geometries and the DC, AC and RF voltages applied to the electrode plates to trap and analyze ions as the case may be. The trapping volume is defined by x and y pairs of spaced flat or plate RF electrodes 11, 12 and 13, 14 in the zx and zy planes. Ions are trapped in the z direction by DC voltages applied to spaced flat or plate end electrodes 16, 17 in the xy plane disposed at the ends of the volume defined by the x, y pair of plates, FIGS. 5A-B and 6A-B, or by DC voltages applied together with RF in sections 18, 19 each comprising pairs of flat or plate electrodes 11a, 12a and 13a, 13b, FIG. 7. In addition to the RF sections flat or plate electrodes 16, 17 can be added, FIG. 8A-B. The DC trapping voltages are illustrated in FIGS. 5B, 6B, 7B, and 8B for each geometry. The ions are trapped in the x, y direction by the quadrupolar RF fields generated by the RF voltages applied to the plates. As will be presently described, ions can be ejected along the z axis through apertures formed in the end electrodes or along the x or y axis through apertures formed in the x or y electrodes. The ions to be analyzed or excited can be formed within the trapping volume by ionizing sample gas while it is within the volume, as for example, by electron impact ionization, or the ions can be externally ionized and injected into the ion trap. The ion trap is generally operated with the assistance of a buffer gas. Thus when ions are injected into the ion trap they lose kinetic energy by collision with the buffer gas and are trapped by the DC potential well. While the ions are trapped by the application of RF trapping voltages AC and other waveforms can be applied to the electrodes to facilitate isolation or excitation of ions in a mass selective fashion as described in more detail below. To perform an axial ejection scan the RF amplitude is scanned while an AC voltage is applied to the end plates. Axial ejection depends on the same principles that control axial ejection from a linear trap with round rod electrodes (U.S. Pat. No. 6,177,668). In order to perform an orthogonal ion ejection scan, the RF amplitude is scanned and the AC voltage is applied on the set of electrodes which include an aperture. The AC amplitude can be scanned to facilitate ejection. Circuits for applying and controlling the RF, AC and DC voltages are well known.

Figure 7A:
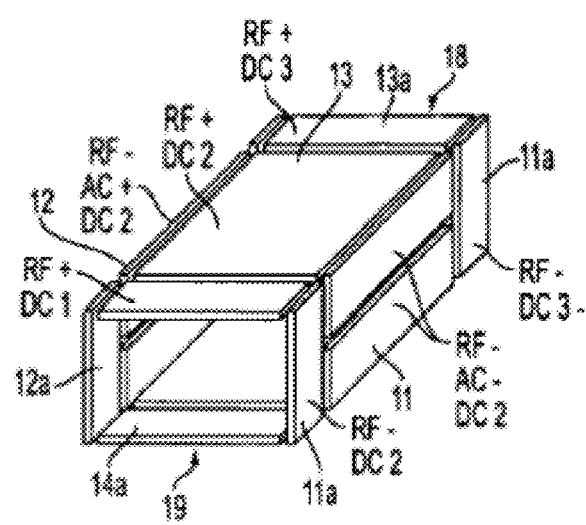
FIGS. 7A-B show a rectilinear ion trap with three RF sections and DC trapping voltages.
Figure 7B:
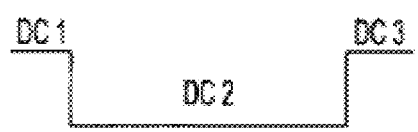
Figure 8A:
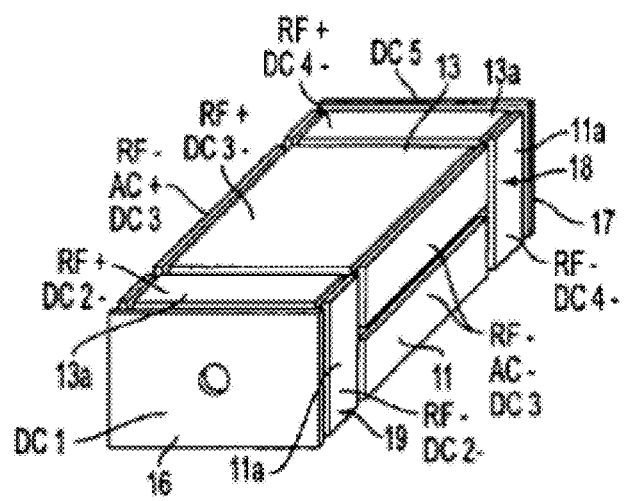
FIGS. 8A-B shows a rectilinear ion trap with three RF sections and end plates and DC trapping voltages.
Figure 8B:
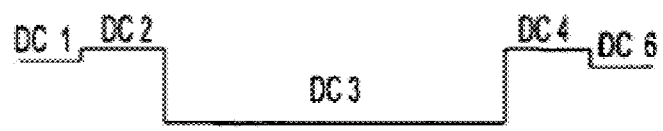

Ions trapped in the RIT can drift out of the trap along the z axis when the DC voltages are changed so as to remove the potential barriers at the end of the RIT. In the RIT configuration of FIGS. 5A-B, the distortion of the RF fields at the end of the RIT may cause undesirable effects on the trapped ions during processes such as isolation, collision induced dissociation (CID) or mass analysis. The addition of the two end RF sections 18 and 19 to the RIT as shown in FIGS. 7A and 8A will help to generate a uniform RF field for the center section. The DC voltages applied on the three sections establish the DC trapping potential and the ions are trapped in the center section, where various processes are performed on the ions in the center section. In cases where ion isolation or ion focusing is needed, end electrodes 16, 17 can be installed as shown in FIGS. 8A-B. Thus FIGS. 5A-B, 6A-B, 7A-B, and 8A-B and other figures to be described merely indicate the applied voltages from the suitable voltage sources.

The relationship between the mass charge ratio of the ions that are trapped, the geometry of the RIT and the applied RF and DC voltages can be estimated by the following equations:

$$\frac{m}{e} = A_2 \frac{8V_{RF}}{q_x x_0^2 \Omega^2} \qquad \text{Eq. 1}$$

$$\frac{m}{e} = -A_2 \frac{16U_{DC}}{a_x x_0^2 \Omega^2} \qquad \text{Eq. 2}$$

where $A_2$ is the quadrupole expansion coefficient in the multipole expansion expression of the electric field, $V_{RF}$ and $U_{DC}$ are the amplitudes of the RF and DC voltages applied between the x and y electrodes, $a_x$ and $q_x$, are the Mathieu parameters, $x_0$ is the center to x electrode distance, and $\Omega$ is the frequency of the applied RF. The secular frequency $\Omega_u$ (u=x or y) can be estimated by:

$$\omega_u = \frac{1}{2}\beta_u \Omega \qquad \text{Eq. 3}$$

where $$\beta_u^2 = a_u + \cfrac{q_u}{(\beta_u+2)^2 - a_u - \cfrac{q_u^2}{(\beta_u+4)^2 - a_u - \cfrac{q_u^2}{(\beta_u+6)^2 - a_u - \ldots}}} + \cfrac{q_u}{(\beta_u-2)^2 - a_u - \cfrac{q_u^2}{(\beta_u-4)^2 - a_u - \cfrac{q_u^2}{(\beta_u-6)^2 - a_u - \ldots}}} \qquad \text{Eq. 4}$$

As seen from the foregoing equations, by the application of RF voltage of predetermined frequency to the RF electrodes and DC voltages to the range which also depends upon the dimensions of the ion trap. The trapped ions can be isolated, ejected, mass analyzed and monitored. Ion isolation is carried out by applying RF/DC voltages to the x y electrode pairs. The RF amplitude determines the center mass of the isolation window, and the ratio of RF to the DC amplitude determines the width of the isolation window. Another method of isolating ions would be to trap ions over a broad mass range by the application of suitable RF and DC voltages and then to apply a wide band waveform containing the secular frequencies of all ions except those that are to be isolated. The wave form is applied between two opposite (typically x or y) electrodes for a predetermined period of time. The ions of interest are unaffected while all other ions are ejected. The secular frequency for any ion of any given m/z value can be determined from Equation 3 and can be changed by varying the RF amplitude. Trapped ions can be excited by applying an AC signal having a frequency equal to the secular frequency of the particular ion to be excited applied between two opposite RF electrodes. Ions with this secular frequency are excited in the trap and can fragment or escape the trapping field. The similar process can be deployed by applying the AC signal to the end electrodes. DC voltage pulses can be applied between any two opposite electrodes and the trapped ions of a wide mass range can be ejected from the RIT.

Figure 9:
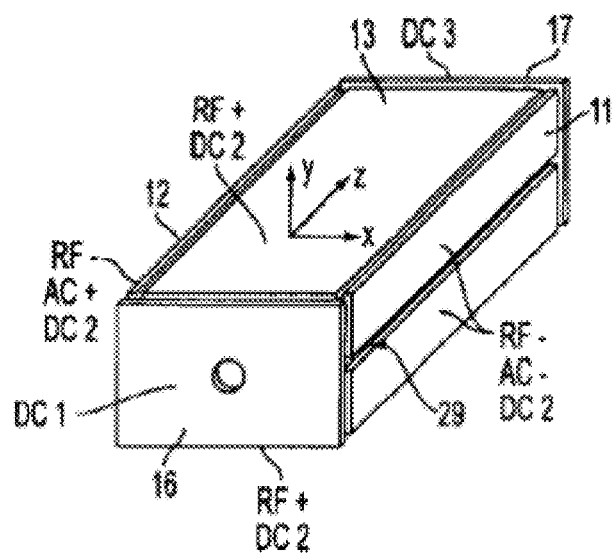
FIG. 9 shows a rectilinear ion trap for scanning ions through slits on the x RF electrodes by application of an AC scanning voltage to the x electrodes.

In certain embodiments, by adding openings or slits 29 on the x (or y) electrodes and applying an AC voltage with selected frequency between these two electrodes, ions can be mass selectively ejected through the slits by scanning the RF amplitude, FIG. 9. Typically, the amplitude of the AC voltage can also be scanned to achieve better resolution.

Figure 10:
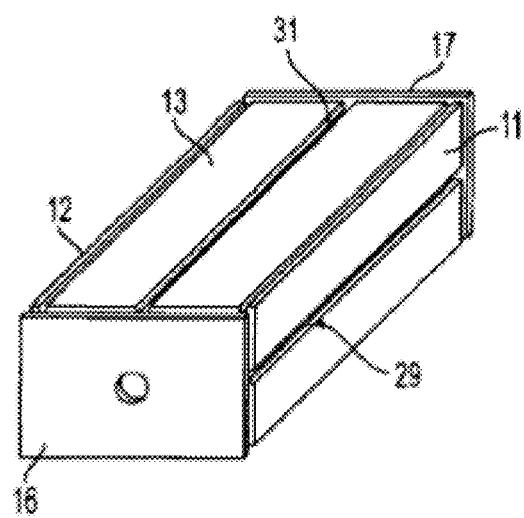
FIG. 10 shows a rectilinear ion trap for scanning ions through slits on the x or y RF electrode by application of an AC scanning voltage to the corresponding electrodes.

The RIT shown in FIG. 10 has slits 29 and 31 on both the x and y electrodes. The ejection direction can be selected by choosing the electrode pair, x or y, or both, to apply the AC signal. Ions of different masses can be ejected from each of the slits.

Ion Focusing

Optionally, systems of the invention can include an ion focusing element positioned after the ion trap, as is described and shown in FIG. 3. In certain embodiments, the ion focusing element includes a plurality of ring electrodes.

The ring electrodes are arranged in order of decreasing inner diameter (FIG. 3). Such a configuration is essentially an ion funnel, that can act to assist in focusing of the ions. Ion funnels are further described for example in Kelly et al. (Mass Spectrometry Reviews, 29:294-312, 2010) and Baird (Ambient ion mobility, Ph. D. Thesis, Purdue University, 2015), the content of which is incorporated by reference herein in its entirety.

Ion Analysis

Figure 11:
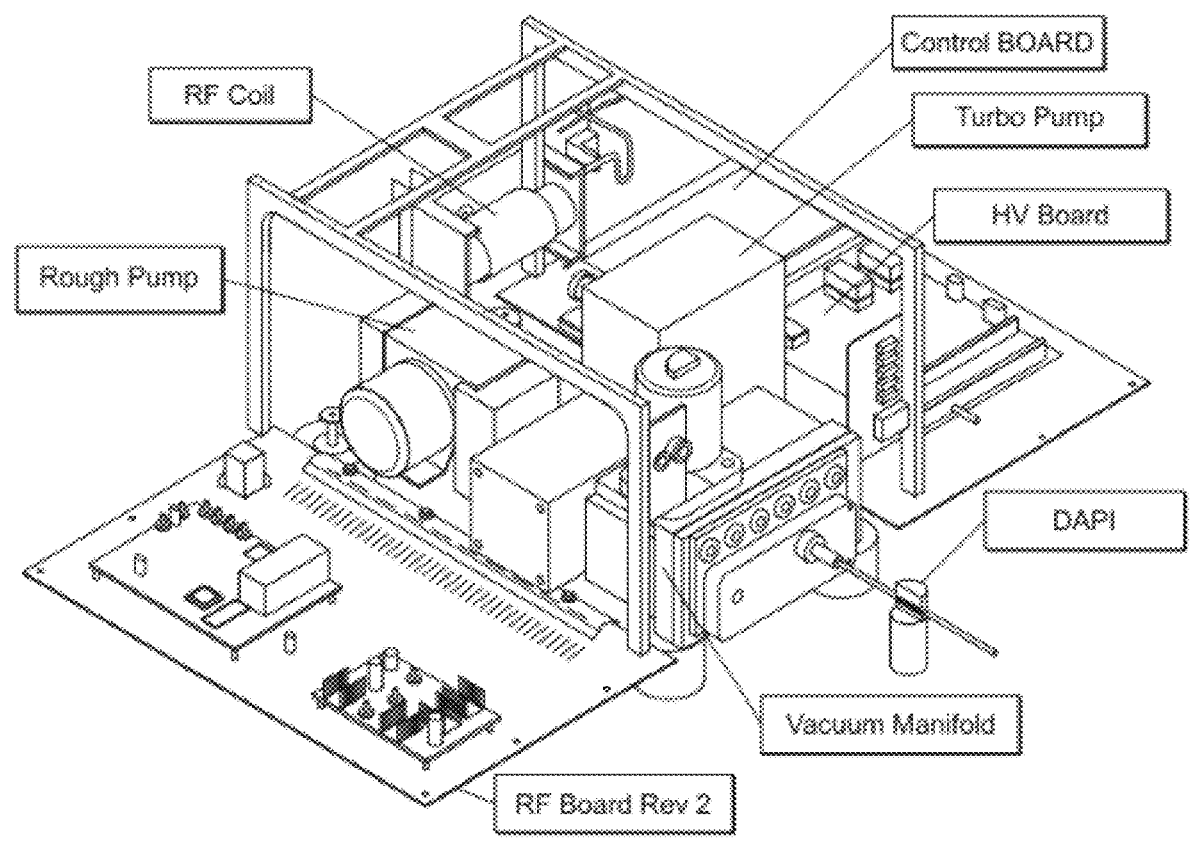
FIG. 11 is a picture illustrating various components and their arrangement in a miniature mass spectrometer.

The detector could be an ion CCD (Hadjar et al., J Am Soc Mass Spectrom. 2011 April; 22(4):612-23, the content of which is incorporated by reference herein in its entirety), faraday plate (Busch, Spectroscopy, 26(11), 2011, the content of which is incorporated by reference herein in its entirety), faraday plate), multichannel plate, or other modality adapted for ambient operation. In certain embodiments, the ions are analyzed by directing them into a mass spectrometer (bench-top or miniature mass spectrometer). FIG. 11 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 11. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety. In certain embodiments, the miniature mass spectrometer does not include the vacuum system.

The mass spectrometer (miniature or benchtop), may be equipped with a discontinuous interface. A discontinuous interface is described for example in Ouyang et al. (U.S. Pat. No. 8,304,718) and Cooks et al. (U.S. patent application publication number 2013/0280819), the content of each of which is incorporated by reference herein in its entirety.

Collection of Ions

Systems and methods for collecting ions that have been analyzed by a mass spectrometer are shown in Cooks, (U.S. Pat. No. 7,361,311), the content of which is incorporated by reference herein in its entirety. Generally, the preparation of microchips arrays of molecules first involves the ionization of analyte molecules in the sample (solid or liquid). The molecules can be ionized by any of the methods discussed above. The ions can then be focused and collected using methods described below or can first be separated based on their mass/charge ratio or their mobility or both their mass/charge ratio and mobility. For example, the ions can be accumulated in an ion storage device such as a quadrupole ion trap (Paul trap, including the variants known as the cylindrical ion trap and the linear ion trap) or an ion cyclotron resonance (ICR) trap. Either within this device or using a separate mass analyzer (such as a quadrupole mass filter or magnetic sector or time of flight), the stored ions are separated based on mass/charge ratios. Additional separation might be based on mobility using ion drift devices or the two processes can be integrated. The separated ions are then deposited on a microchip or substrate at individual spots or locations in accordance with their mass/charge ratio or their mobility to form a microarray.

To achieve this, the microchip or substrate is moved or scanned in the x-y directions and stopped at each spot location for a predetermined time to permit the deposit of a sufficient number of molecules to form a spot having a predetermined density. Alternatively, the gas phase ions can be directed electronically or magnetically to different spots on the surface of a stationary chip or substrate. The molecules are preferably deposited on the surface with preservation of their structure, that is, they are soft-landed. Two facts make it likely that dissociation or denaturation on landing can be avoided. Suitable surfaces for soft-landing are chemically inert surfaces that can efficiently remove vibrational energy during landing, but which will allow spectroscopic identification. Surfaces which promote neutralization, rehydration or having other special characteristics might also be used for protein soft-landing.

Generally, the surface for ion landing is located after the ion focusing device, and in embodiments where ions are first separated, the surface is located behind the detector assembly of the mass spectrometer. In the ion detection mode, the high voltages on the conversion dynode and the multiplier are turned on and the ions are detected to allow the overall spectral qualities, signal-to-noise ratio and mass resolution over the full mass range to be examined. In the ion-landing mode, the voltages on the conversion dynode and the multiplier are turned off and the ions are allowed to pass through the hole in the detection assembly to reach the landing surface of the plate (such as a gold plate). The surface is grounded and the potential difference between the source and the surface is 0 volts.

An exemplary substrate for soft landing is a gold substrate (20 mm×50 mm, International Wafer Service). This substrate may consist of a Si wafer with 5 nm chromium adhesion layer and 200 nm of polycrystalline vapor deposited gold. Before it is used for ion landing, the substrate is cleaned with a mixture of $H_2SO_4$ and $H_2O_2$ in a ratio of 2:1, washed thoroughly with deionized water and absolute ethanol, and then dried at 150° C. A Teflon mask, 24 mm×71 mm with a hole of 8 mm diameter in the center, is used to cover the gold surface so that only a circular area with a diameter of 8 mm on the gold surface is exposed to the ion beam for ion soft-landing of each mass-selected ion beam. The Teflon mask is also cleaned with 1:1 $MeOH:H_2O$ (v/v) and dried at elevated temperature before use. The surface and the mask are fixed on a holder and the exposed surface area is aligned with the center of the ion optical axis.

Any period of time may be used for landing of the ions. Between each ion-landing, the instrument is vented, the Teflon mask is moved to expose a fresh surface area, and the surface holder is relocated to align the target area with the ion optical axis. After soft-landing, the Teflon mask is removed from the surface.

In another embodiment a linear ion trap can be used as a component of a soft-landing instrument. Ions travel through a heated capillary into a second chamber via ion guides in chambers of increasing vacuum. The ions are captured in the linear ion trap by applying suitable voltages to the electrodes and RF and DC voltages to the segments of the ion trap rods. The stored ions can be radially ejected for detection. Alternatively, the ion trap can be operated to eject the ions of selected mass through the ion guide, through a plate onto the microarray plate. The plate can be inserted through a mechanical gate valve system without venting the entire instrument.

The advantages of the linear quadrupole ion trap over a standard Paul ion trap include increased ion storage capacity and the ability to eject ions both axially and radially. Linear ion traps give unit resolution to at least 2000 Thomspon (Th) and have capabilities to isolate ions of a single mass/charge ratio and then perform subsequent excitation and dissociation in order to record a product ion MS/MS spectrum. Mass analysis will be performed using resonant waveform methods. The mass range of the linear trap (2000 Th or 4000 Th but adjustable to 20,000 Th) will allow mass analysis and soft-landing of most molecules of interest. In the soft-landing instrument described above the ions are introduced axially into the mass filter rods or ion trap rods. The ions can also be radially introduced into the linear ion trap.

Methods of operating the above described soft-landing instruments and other types of mass analyzers to soft-land ions of different masses at different spots on a microarray are now described. The ions of the functionalized analyte from the sample are introduced into the mass filter. Ions of selected mass-to-charge ratio will be mass-filtered and soft-landed on the substrate for a period of time. The mass-filter settings then will be scanned or stepped and corresponding movements in the position of the substrate will allow deposition of the ions at defined positions on the substrate.

The ions can be separated in time so that the ions arrive and land on the surface at different times. While this is being done the substrate is being moved to allow the separated ions to be deposited at different positions. A spinning disk is applicable, especially when the spinning period matches the duty cycle of the device. The applicable devices include the time-of-flight and the linear ion mobility drift tube. The ions can also be directed to different spots on a fixed surface by a scanning electric or magnetic fields.

In another embodiment, the ions can be accumulated and separated using a single device that acts both as an ion storage device and mass analyzer. Applicable devices are ion traps (Paul, cylindrical ion trap, linear trap, or ICR). The ions are accumulated followed by selective ejection of the ions for soft-landing. The ions can be accumulated, isolated as ions of selected mass-to-charge ratio, and then soft-landed onto the substrate. Ions can be accumulated and landed simultaneously. In another example, ions of various mass-to-charge ratios are continuously accumulated in the ion trap while at the same time ions of a selected mass-to-charge ratio can be ejected using SWIFT and soft-landed on the substrate.

In a further embodiment of the soft-landing instrument ion mobility, is used as an additional (or alternative) separation parameter. As before, ions are generated by a suitable ionization source, such as those described herein. The ions are then subjected to pneumatic separation using a transverse air-flow and electric field. The ions move through a gas in a direction established by the combined forces of the gas flow and the force applied by the electric field. Ions are separated in time and space. The ions with the higher mobility arrive at the surface earlier and those with the lower mobility arrive at the surface later at spaces or locations on the surface.

The instrument can include a combination of the described devices for the separation and soft-landing of ions of different masses at different locations. Two such combinations include ion storage (ion traps) plus separation in time (TOF or ion mobility drift tube) and ion storage (ion traps) plus separation in space (sectors or ion mobility separator).

It is desirable that the structure of the analyte be maintained during the soft-landing process. On such strategy for maintaining the structure of the analyte upon deposition involves keeping the deposition energy low to avoid dissociation or transformation of the ions when they land. This needs to be done while at the same time minimizing the spot size. Another strategy is to mass select and soft-land an incompletely desolvated form of the ionized molecule. Extensive hydration is not necessary for molecules to keep their solution-phase properties in gas-phase. Hydrated molecular ions can be formed by electrospray and separated while still "wet" for soft-landing. The substrate surface can be a "wet" surface for soft-landing, this would include a surface with as little as one monolayer of water. Another strategy is to hydrate the molecule immediately after mass-separation and prior to soft-landing. Several types of mass spectrometers, including the linear ion trap, allow ion/molecule reactions including hydration reactions. It might be possible to control the number of water molecules of hydration. Still further strategies are to deprotonate the mass-selected ions using ion/molecule or ion/ion reactions after separation but before soft-landing, to avoid undesired ion/surface reactions or protonate at a sacrificial derivatizing group which is subsequently lost.

Different surfaces are likely to be more or less well suited to successful soft-landing. For example, chemically inert surfaces which can efficiently remove vibrational energy during landing may be suitable. The properties of the surfaces will also determine what types of in situ spectroscopic identification are possible. The ions can be soft-landed directly onto substrates suitable for MALDI. Similarly, soft-landing onto SERS-active surfaces should be possible. In situ MALDI and secondary ion mass spectrometry can be performed by using a bi-directional mass analyzer such as a linear trap as the mass analyzer in the ion deposition step and also in the deposited material analysis step.

In another embodiment, ions may be collected in the ambient environment (ambient pressure but still under vacuum) without mass analysis. The collected ions may then be subsequently analyzed by any suitable technique, such as infrared spectrometry or mass spectrometry. In this embodiment, the ion focusing apparatus of the system is coupled to a moving stage. A high DC field is applied to the focusing electrode, creating an electric field that, optionally with pneumatics, focuses the ions into a steel capillary at the exit of the focusing apparatus. The ions are ejected from a distal end of the capillary and soft landed (collected) on a surface. The moving stage ensures that molecules are being deposited at discreet locations. The soft landed material can have any structure, and in exemplary embodiments, the soft landed ions generate crystalline material.

Sample

The systems of the invention can be used to analyze many different types of samples. A wide range of heterogeneous samples can be analyzed, such as biological samples, environmental samples (including, e.g., industrial samples and agricultural samples), and food/beverage product samples, etc.).

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal. Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 µm porosities. Samples containing colloidal material or a large amount of fine particulates, considerable pressure may be required to force the liquid sample through the filter. Accordingly, for samples such as soil extracts or wastewater, a prefilter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected. More particularly, systems of the invention can be used to detect molecules in a biological sample that are indicative of a disease state. Specific examples are provided below.

Where one or more of the target molecules in a sample are part of a cell, the aqueous medium may also comprise a lysing agent for lysing of cells. A lysing agent is a compound or mixture of compounds that disrupt the integrity of the membranes of cells thereby releasing intracellular contents of the cells. Examples of lysing agents include, but are not limited to, non-ionic detergents, anionic detergents, amphoteric detergents, low ionic strength aqueous solutions (hypotonic solutions), bacterial agents, aliphatic aldehydes, and antibodies that cause complement dependent lysis, for example. Various ancillary materials may be present in the dilution medium. All of the materials in the aqueous medium are present in a concentration or amount sufficient to achieve the desired effect or function.

In some examples, where one or more of the target molecules are part of a cell, it may be desirable to fix the cells of the sample. Fixation of the cells immobilizes the cells and preserves cell structure and maintains the cells in a condition that closely resembles the cells in an in vivo-like condition and one in which the antigens of interest are able to be recognized by a specific affinity agent. The amount of fixative employed is that which preserves the cells but does not lead to erroneous results in a subsequent assay. The amount of fixative may depend for example on one or more of the nature of the fixative and the nature of the cells. In some examples, the amount of fixative is about 0.05% to about 0.15% or about 0.05% to about 0.10%, or about 0.10% to about 0.15% by weight. Agents for carrying out fixation of the cells include, but are not limited to, cross-linking agents such as, for example, an aldehyde reagent (such as, e.g., formaldehyde, glutaraldehyde, and paraformaldehyde,); an alcohol (such as, e.g., $C_1$-$C_5$ alcohols such as methanol, ethanol and isopropanol); a ketone (such as a $C_3$-$C_5$ ketone such as acetone); for example. The designations $C_1$-$C_5$ or $C_3$-$C_5$ refer to the number of carbon atoms in the alcohol or ketone. One or more washing steps may be carried out on the fixed cells using a buffered aqueous medium.

If necessary after fixation, the cell preparation may also be subjected to permeabilization. In some instances, a fixation agent such as, an alcohol (e.g., methanol or ethanol) or a ketone (e.g., acetone), also results in permeabilization and no additional permeabilization step is necessary. Permeabilization provides access through the cell membrane to target molecules of interest. The amount of permeabilization agent employed is that which disrupts the cell membrane and permits access to the target molecules. The amount of permeabilization agent depends on one or more of the nature of the permeabilization agent and the nature and amount of the cells. In some examples, the amount of permeabilization agent is about 0.01% to about 10%, or about 0.1% to about 10%. Agents for carrying out permeabilization of the cells include, but are not limited to, an alcohol (such as, e.g., $C_1$-$C_5$ alcohols such as methanol and ethanol); a ketone (such as a $C_3$-$C_5$ ketone such as acetone); a detergent (such as, e.g., saponin, TRITON X-100 (4-(1,1,3,3-Tetramethylbutyl)phenyl-polyethylene glycol, t-Octylphenoxypolyethoxyethanol, Polyethylene glycol tert-octylphenyl ether buffer, commercially available from Sigma Aldrich), and TWEEN-20 (Polysorbate 20, commercially available from Sigma Aldrich)). One or more washing steps may be carried out on the permeabilized cells using a buffered aqueous medium.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for separating ions, the system comprising:
an ionization source that generates ions; and
an ion trap maintained at about or above atmospheric pressure that comprises a plurality of electrodes and at least one inlet configured to receive a gas flow and at least one outlet, wherein the plurality of electrodes are arranged such that an exit point exists between the plurality of electrodes and ions excited by the plurality of electrodes pass through the exit point and become entrained in a gas flow that passes along an exterior of the plurality of electrodes toward the at least one outlet;
wherein the system is configured such that a combination of the gas flow and one or more frequency components of the electric field produced by the electrodes separates the ions based on mass-to-charge ratio and sends the separated ions through the at least one outlet of the ion trap.

2. The system according to claim 1, further comprising a gas source operably coupled to the at least one inlet.

3. The system according to claim 1, further comprising an ion detector configured to receive the separated ions.

4. The system according to claim 3, further comprising an ion focusing element positioned between the ion trap and the ion detector.

5. The system according to claim 3, wherein the ion detector is a mass spectrometer.

6. The system according to claim 5, wherein the mass spectrometer is a miniature mass spectrometer that does not include a vacuum system.

7. A method for separating ions at about or above atmospheric pressure, the method comprising:
trapping ions within an ion trap at about or above atmospheric pressure, wherein the ion trap comprises a plurality of electrodes and at least one inlet configured to receive a gas flow and at least one outlet, wherein the plurality of electrodes are arranged such that an exit point exists between the plurality of electrodes and ions excited by the plurality of electrodes pass through the exit point and become entrained in a gas flow that passes along an exterior of the plurality of electrodes toward the at least one outlet; and
applying an electric field and the gas flow to the ions within the ion trap at about or above atmospheric pressure to separate the ions by mass-to-charge ratio.

8. The method according to claim 7, wherein ions of particular mass-to-charge ratios are separated from remaining trapped ions and directed into the gas flow thereby separating the ions by mass-to-charge ratio.

9. The method according to claim 8, further comprising analyzing the ions separated by mass-to-charge ratio.

10. The method according to claim 9, wherein analyzing comprises directing the ions into a mass spectrometer.

11. The method according to claim 10, wherein the mass spectrometer is operated at about or above atmospheric pressure.

12. The method according to claim 7, wherein the electric field comprises frequency components that correspond to characteristic frequencies of motion of at least some of the trapped ions, and the frequency components of the electric field can be varied so as to select any ions of any desired mass-to-charge or group of mass-to-charge values.

* * * * *